United States Patent [19]

Hiramatsu

[11] 4,428,467

[45] Jan. 31, 1984

[54] FRICTION CLUTCH CONTROL DEVICE

[75] Inventor: Takeo Hiramatsu, Kyoto, Japan

[73] Assignee: Mitsubishi Jidosha Kogyo Kabushiki Kaisha, Tokyo, Japan

[21] Appl. No.: 320,036

[22] Filed: Nov. 10, 1981

[30] Foreign Application Priority Data

Mar. 31, 1981 [JP] Japan .................. 56-46402

[51] Int. Cl.³ .................... B60K 41/28; F16H 3/74
[52] U.S. Cl. .................... 192/3.31; 192/3.58; 192/0.092; 192/0.076; 74/731; 74/752 A; 361/242
[58] Field of Search ............ 192/0.032, 3.58, 3.57, 192/3.31, 0.092, 3.59; 74/752 A, 864, 868, 866, 860, 867, 731, 732, 733; 361/242

[56] References Cited

U.S. PATENT DOCUMENTS

| | | | |
|---|---|---|---|
| 2,824,632 | 2/1958 | Lucia et al. | 192/3.31 X |
| 3,897,698 | 8/1975 | Ohsaka | 74/732 |
| 4,386,687 | 6/1983 | Chevalier et al. | 192/0.033 X |
| 4,388,987 | 6/1983 | Hennessey et al. | 192/3.31 X |
| 4,391,166 | 7/1983 | Kubo et al. | 192/3.31 X |

Primary Examiner—George H. Krizmanich
Attorney, Agent, or Firm—Sughrue, Mion, Zinn, Macpeak & Seas

[57] ABSTRACT

A control device for a hydraulic pressure operated friction clutch in an automatic speed changer has a device which detects a speed difference (S) between an engine drive shaft and an input shaft. Load and speed detecting devices detect the engine load and drive shaft speed respectively, this load and speed information being used to set a second speed difference (So). A hydraulic pressure controlling device then controls the hydraulic pressure supplied to the friction clutch control device so that the first speed difference (S) approaches the second speed difference (So). In addition, a fail-safe circuit releases the friction clutch if the first speed difference remains abnormally large for a predetermined period of time.

12 Claims, 5 Drawing Figures

FRICTION CLUTCH CONTROL DEVICE

BACKGROUND OF THE INVENTION

1. Field of the Invention

This invention relates to a control device for a friction clutch which is provided in an automatic speed changer for a vehicle.

2. Description of the Prior Art

A reciprocating piston type engine suffers from tongue variations attributing to inertia accompanying the reciprocation of the piston and to pressure variation in the combustion chamber. Thus, the drive shaft is rotated with torque variations and speed variations.

If such an engine is installed on a vehicle, the aforementioned torque variations harm the driving characteristic of the vehicle. Especially when the vehicle is driven at a low speed, the torque variations are transmitted to the vehicle and the drive shaft. Therefore, even if the average drive torque is adequate for driving the vehicle, vibration is caused by the torque variations, and accordingly the low limit driving speed is increased substantially. Thus, the operator has to select a transmission position having a large reduction gear ratio. As a result, the engine speed is unduely increased, fuel is not economically used, and noise is increased. Especially during the idling operation, the torque variations are transmitted to the speed changer, or transmission, so that the gears and shafts therein are vibrated with rattling noises.

In order to overcome these difficulties, a method has been studied in which a hydraulic pressure operated friction clutch in an automatic speed changer is allowed to slip slightly to thereby interrupt the transmission of the torque variation.

However, if, in such an automatic speed changer, the hydraulic pressure applied to the friction clutch is abnormally decreased and therefore the friction clutch is excessively slipped, the clutch generates a large amount of heat which burns the friction plate. Powder generated by this wear of the friction plate enters the hydraulic system and sticks the valves therein, which may make it impossible to drive the vehicle.

Accordingly, a primary object of this invention is to provide a friction clutch control device in which the transmission of the torque variation of the drive shaft to the input shaft of the speed changer is prevented for an effective torque transmission, and in which the generation of vibration and noise is prevented and fuel consumption is reduced.

Another object of the invention is to provide a friction clutch control device by which the low speed operation range of an engine installed on a vehicle is increased to facilitate the operating condition of the vehicle with a reduction of the fuel consumption.

A further object of the invention is to provide a friction clutch control device by which an excessive slip operation range peculiar to a fluid coupling in a fluid coupling type automatic speed changer for a vehicle is reduced.

A still further object of the invention is to provide a friction clutch control device by which burning of a friction clutch interposed between the drive shaft of the engine and the input shaft of the speed changer is prevented, and sticking of powder created by the wear of the friction plate to hydraulic control valves in the automatic speed changer is also prevented, thus improving the reliability of the friction clutch.

The foregoing objects and other objects of the invention have been achieved by the provision of a friction clutch control device, which, according to the invention, comprises, between an engine side drive shaft and a speed changer side input shaft for which power transmission is effected through the fluid coupling of a fluid coupling type automatic speed changer for a vehicle: a hydraulic operating device for operating a friction clutch into and out of engagement, which is coupled in parallel with the fluid coupling so as to provide a separate path for power transmission; drive condition detecting means for detecting drive conditions of the engine of the vehicle; speed difference detecting means for detecting a difference between speeds of the drive shaft and input shaft; speed difference setting means for setting a speed difference between the drive shaft and input shaft according to a signal provided by the drive condition detecting means; hydraulic pressure controlling means for controlling a hydraulic pressure supplied to the hydraulic operating device so that a speed difference (S) detected by the speed difference detecting means approaches a second speed difference (So) set by the speed difference setting means; and a fail-safe circuit which, when the first speed difference (S) is maintained at an abnormally large level for a predetermined period of time, stops the hydraulic pressure controlling means, to release the friction clutch, or by the provision of a device obtained by modifying the above-described control device.

DESCRIPTION OF THE PREFERRED EMBODIMENTS

Embodiments of this invention will be described with reference to the accompanying drawings in detail.

Figure 1:
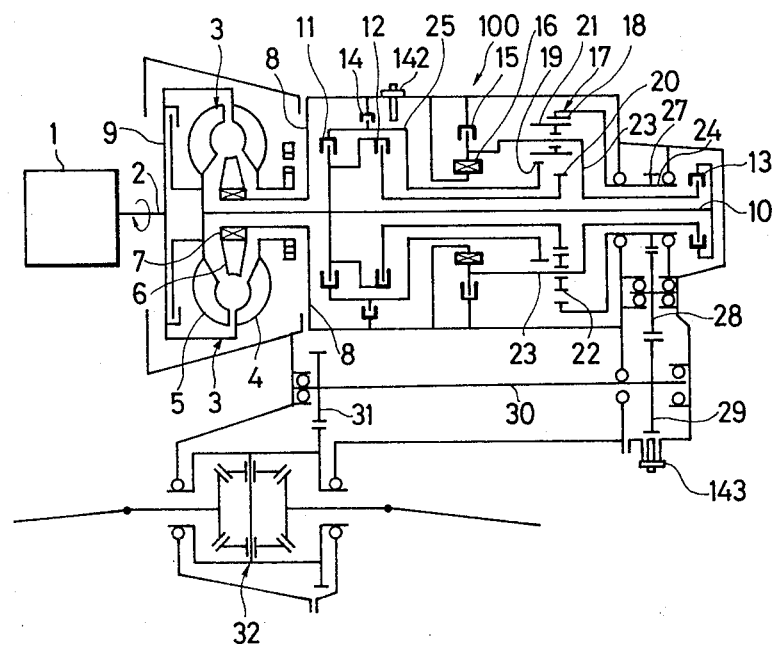
FIG. 1 is an explanatory diagram outlining an automatic speed changer for a vehicle.

FIG. 1 shows an automatic speed changer having four-forward and one-reverse speed change ratios. The crank shaft 2 of an engine on a vehicle is connected directly to a pump 4 of a torque converter 3. The torque converter 3 has the pump 4, a turbine 5, a stator 6 and a one-way clutch 7. The stator 6 is coupled through a one-way clutch 7 to a casing 8. A friction clutch 9 is provided between the crank shaft 2 and the turbine 5. The clutch 9 is coupled with a slip corresponding to an operating hydraulic pressure. Therefore, the output of the engine 1 is transmitted through the friction clutch 9 or the torque converter 3 to the turbine 5. The torque transmitted to the turbine 5 is transmitted through an input shaft 10 to a reduction gear train 100 which is provided at the rear stage to obtain the four-forward and one-reverse speed change ratios.

The reduction gear train 100 comprises three clutches 11, 12 and 13, two brakes 14 and 15, a one-way clutch 16 and a Ravegnaux type planet gear assembly 17. The planet gear assembly 17 is made up of an annulus gear 18, a reverse sun gear 19, a forward sun gear 20, a long pinion 21, a short pinion 22 and a carrier 23. The annulus gear 18 is fixedly secured to an output shaft 24, and the reverse sun gear 19 is fixedly secured to a kick-down drum 25. The drum 25 is secured through the kick-down brake 14 to the casing 8 and is coupled through the front clutch 11 to the input shaft 10. The forward sun gear 20 is coupled through the rear clutch 12 to the input shaft 10. The carrier 23, holding the long pinion 21 and the short pinion 22, is secured to the casing 8 through the one-way clutch 16. The carrier 23 is also coupled to the input shaft 10 through the four-speed clutch 13 provided at the rear end of the reduction gear train 100 and is further secured to the casing through the low reverse brake 15.

The three clutches 11, 12 and 13 and the two brakes 14 and 15 are selectively engaged by a hydraulic control mechanism (not shown) to obtain various speed change ratios.

The output of the reduction gear train 100 is transmitted through a transfer drive gear 27 secured to the output shaft 24 and through a transfer idle gear 28 to a transfer driven gear 29. The output thus transmitted is further transmitted through a transfer shaft 30 integral with the driven gear 29 and through a helical gear 31 to a differential gear 32.

Figure 2:
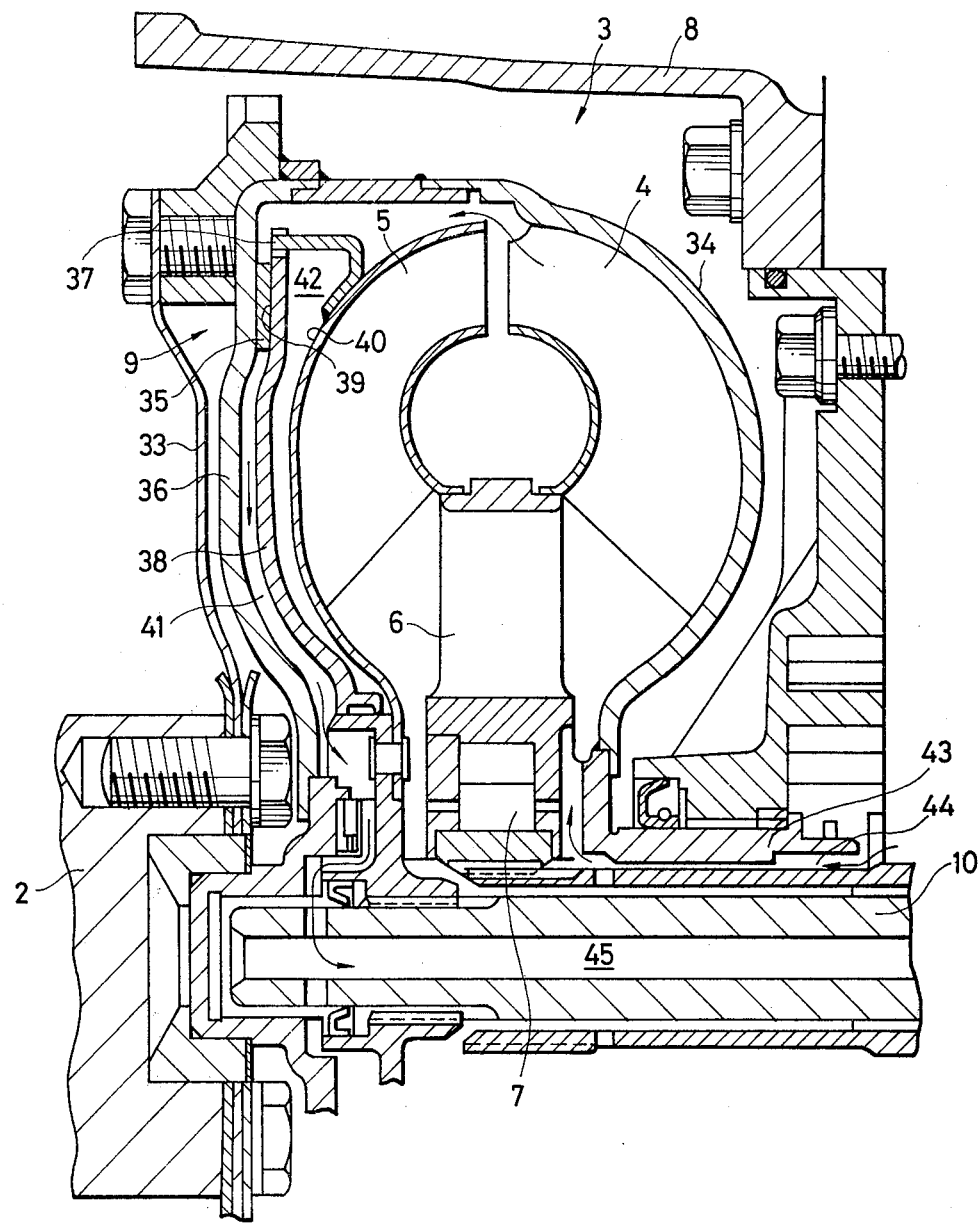
FIG. 2 is a sectional view of a torque converter and a friction clutch.

The friction clutch 9 will be described with reference to FIG. 2 in more detail. The friction clutch 9 is a slip type clutch which transmits power while slipping in a predetermined operation range. When the clutch 9 is operated, the power of the engine 1 is transmitted to the input shaft 10 mainly through the clutch 9, and a part of the power is transmitted through the torque converter 3. Thus, the clutch can reduce the slip of the torque converter to economically use fuel and decrease the variation of the torque transmitted from the engine 1.

The torque converter 3 is integral with the friction clutch 9. The crank shaft 2 is fixedly secured to a drive plate 33. The drive plate 33 is coupled to a plate 36 to which the outer shell 34 of the pump 4 of the torque converter 3 and a friction plate 35 of the friction clutch 9 are fixedly secured. The turbine 5 is fitted through a spline onto the input shaft 10 so that the turbine 5 and the input shaft 10 turn as one unit. The turbine 5 is coupled through a transfer ring 37 to a piston 38 so that it is turned with the piston 38. The piston 38 is fitted into the input shaft 10 in such a manner that it is freely slidable in the axial direction and is confronted with the plate 36. The piston 38 has a frictional surface 39 which is abutted against the friction plate 35. A hydraulic pressure chamber 41 is formed between the piston 38 and the plate 36, and a hydraulic pressure chamber 42 is formed between the outer shell 40 of the turbine 5 and the piston 38.

The supply of oil to the torque converter 3 and the friction clutch 9 is controlled by a hydraulic control device (described later). As indicated with the arrows in FIG. 2, the oil is introduced into the torque converter 3 through an oil path 44 which is formed on the inner surface of a sleeve 43 mounted on the input shaft 10 of the pump 4. After circulating in the torque converter, the oil is introduced into the hydraulic pressure chamber 42 and is then introduced into the chamber 41 passing through the clearance between the friction plate 35 of the clutch 9 and the frictional surface 39. Thereafter, the oil is discharged through an oil path 45 formed in the input shaft 10, or it is circulated in the opposite direction.

The aforementioned hydraulic control device will be described with reference to FIG. 3. The hydraulic control device operates to control the operation of the friction clutch 9 by using the pressure of the oil which is supplied from an oil pool 46 through an oil filter 47 and an oil path 152 by an oil pump 48. The hydraulic control device essentially comprises a regulating valve 50, a torque converter control valve 60, a friction clutch control valve 70, a reducing valve 80, a manual valve 90 and a solenoid valve 110 which are connected by oil paths.

The solenoid valve 110 is a duty control solenoid valve which is closed when deenergized, to open or close an orifice 111 in response to an electrical signal from an electronic control device 120. The solenoid valve 110 has a solenoid 112, a valve 113 arranged in the solenoid to open or close the orifice 111, and a spring 114 adapted to urge the valve 113 to open.

The electronic control device 120 operates or stops the solenoid valve 110 and controls the single pulse current width of a pulse current supplied to the solenoid valve according to the operating conditions of the vehicle which is the valve opening time thereby controlling the hydraulic pressure. The electronic control device 120 has, main input elements, an engine load detecting device 140 for detecting the negative pressure in the suction manifold of the engine 1, an engine speed detecting device 141, a device 142 for detecting the speed of the kick-down drum 25 (FIG. 1), a transfer driven gear (29) speed detecting device 143 provided for detecting the speed of the output shaft 24, and a water temperature detecting device 144 for detecting the temperature of a cooling water for the engine 1. The oil discharged from the oil pump 48 is led through an oil path 151 to the regulating valve 50, the manual valve 90, the friction clutch control valve 70 and to the reducing valve 80.

The regulating valve 50 has a valve spool 53 with pressure receiving surfaces 51 and 52, and a spring 54. When the manual valve 90 is set to positions N, D, 2 and L, the hydraulic pressure in the oil path 151 acts on the pressure receiving surface 51 through the manual valve 90, an oil path 153 and an orifice 154, as a result of which the hydraulic pressure in the oil path 151 is adjusted. When the manual valve 90 is set at a position R, the pressure in the oil path 151 acts on the pressure receiving surface 52 through an oil path 155 and an orifice 156, as a result of which the pressure in the oil path 151 is adjusted.

The oil introduced into the reducing valve 80 through the oil path 151 is led into an oil path 157 after the pressure thereof has been reduced by the reducing valve 80. The reducing valve 80 has a valve spool 81, a spring 82 and an adjusting screw 83. The reducing valve 80 carries out a pressure reducing operation through the balance of the spring 82 with a hydraulic pressure which is caused by the difference in area between pressure receiving surfaces 84 and 85 confronted with each other on the valve spool 81. The hydraulic pressure can be set to a predetermined value by operating the adjusting screw 83.

The oil introduced into the torque converter control valve 60 through an oil path 158 from the regulating valve 50 is further introduced into the friction clutch control valve 70 through an oil path 159 after the pressure has been adjusted. Furthermore, the oil in the oil path 159 is supplied through an orifice 160, an oil path 161 and an oil cooler 49 to a lubricating system (not shown) for the reduction gear train 100, which is close to the engine 1, and it is further supplied through an orifice 162 to a lubricating system which is remote from the engine 1.

The oil introduced into the oil path 157 with the pressure reduced by the reducing valve 80 is supplied through an orifice 163 to the orifice 111 which is opened and closed by the solenoid valve 110.

The friction clutch control valve 70 has a valve spool 71 and a spring 72. The hydraulic pressure which has been adjusted to a predetermined value by the solenoid 110 is applied to a pressure receiving surface 73 provided at one end of the valve spool. The direction of flow of the oil supplied to the torque converter 3 and the friction clutch 9 and the oil pressure is controlled with the balance of the elastic force of the spring 72 with the hydraulic pressure acting on the pressure receiving surface 73.

An oil path 44 communicating with the torque converter 3 is connected to an oil path 164, and an oil path 45 communicating with the friction clutch 9 is connected to an oil path 165. By the operation of the friction clutch control valve 70, the oil path is selectively communicated with the supply oil path 151 through an orifice 166 adapted to reduce the ripple component of the hydraulic pressure or with the discharge oil path 161, while the oil path 165 is selectively communicated with the supply oil path 159 or the discharge oil path 161.

Figure 3:
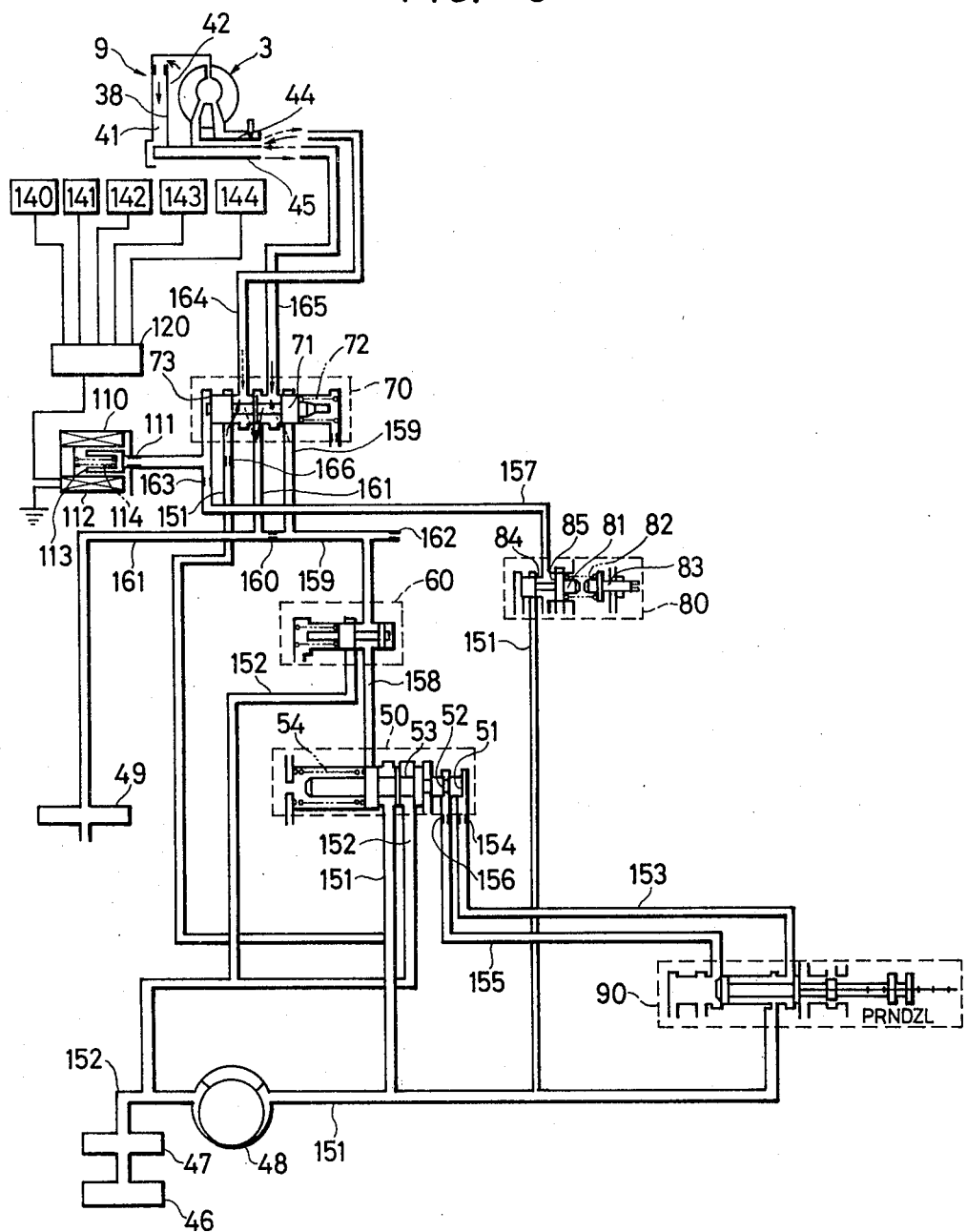
FIG. 3 is a connection diagram showing a hydraulic control device for the friction clutch.

While the pulse current is applied to the solenoid valve 110 by the electronic control device 120, the oil whose pressure is adjusted by the friction clutch control valve 70 is supplied from the oil path 151 to the oil path 164 as indicated by the solid line arrows in FIG. 3, and the friction clutch is engaged with a predetermined slip as the piston 38 is depressed to the left by the hydraulic pressure in the hydraulic pressure chamber 42. If the hydraulic pressure acting on the piston 38 is controlled by the electronic control device 20 so that the slip is set to the extent that the speed of the input shaft 10 is slightly lower than the speed variation range of the crank shaft 2 due to the variable torque of the engine 1, then the variable torque of the engine 1 is scarcely transmitted. Therefore, the power transmission in this case is high in efficiency, which contributes to an economical use of fuel.

When the vehicle is started or accelerated quickly, disengagement of the friction clutch 9 is required to utilize the characteristic of the torque converter 3. In this operation, the supply of the pulse current to the solenoid valve 110 is suspended by the electronic control device 120, and therefore the friction clutch control valve 70 is switched, so that the oil flows in the opposite direction as indicated by the broken line arrows in FIG. 3. That is, the oil whose pressure is adjusted by the torque converter control valve 60 is supplied into the oil path 165 from the oil path 159, and therefore the piston 38 is moved to the right by the hydraulic pressure in the hydraulic pressure chamber 41, so that the engagement of the friction clutch 9 is released.

Figure 4:
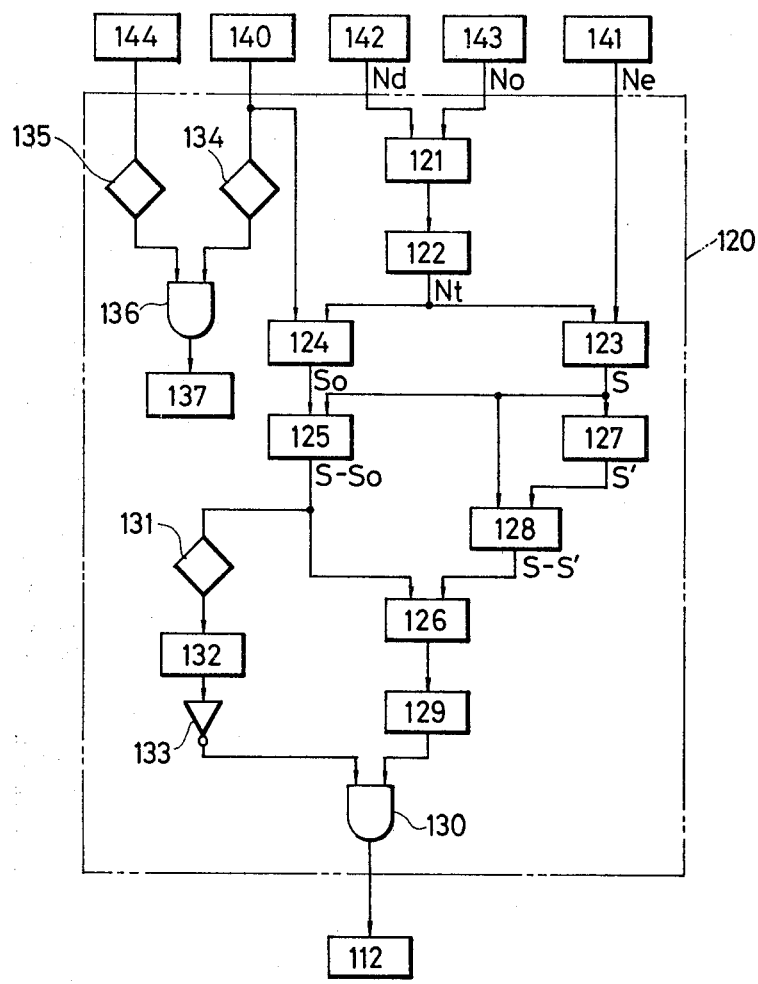
FIG. 4 is a block diagram showing one example of an electronic control device according to the present invention.

The electronic control device 120 will be described with reference to FIG. 4.

The electronic control device 120 operates to detect from the speed of the engine 1 and the speed of the turbine 5 in the torque converter 3 a slip speed between them, and to perform the feedback control of the pulse current width of the pulse current applied to the solenoid 112 in the solenoid valve 110 so that the slip speed approaches a target value.

A transmission position detecting circuit 121 operates to detect a transmission position from a speed Nd of the kick-down drum 25 which is detected by a speed detecting device 142 and from a speed No of the transfer driven gear 29 which is detected by a speed detecting device 143. A speed calculating circuit 122 calculates a speed Nt of the turbine 5 by using the transmission stage detection signal and the speed No signal which are outputted by the transmission position detecting circuit 121.

A slip speed calculating circuit 123 calculates a slip speed between the engine and the turbine from the turbine speed Nt and an engine speed Ne which is detected from a voltage pulse induced in the ignition coil of the engine by a speed detecting device 141. The slip speed calculating circuit 123 utilizes the fact that, when the pulse widths representative of an engine speed and a turbine speed are counted with a high frequency clock pulse have a frequency proportional to the engine speed or the turbine speed, the difference between the resultant count values is substantially equal to the slip speed.

A target value setting circuit 124 sets a slip speed target value So by using the turbine speed Nt and the negative pressure in the suction manifold of the engine. A deviation calculating circuit 125 calculates a deviation of the slip speed S from the target value So. The deviation (S-So) is applied to a feedback data calculating circuit 126.

The slip speed S is applied to a memory 127 and a slip variation calculating circuit 128. Upon reception of the slip speed S, the memory 127 supplies the preceding slip speed S' which was received about 1.5 seconds before to the calculating circuit 128, where the slip speed variation value (S-S') is calculated. The variation value (S-S') is applied to the feedback data calculating circuit 126.

In the feedback data calculating circuit 126, the deviation value (S-So) and the variation value (S-S') are used to calculate a feedback data $K_2(S-So)+K_3(S-S')$, where $K_2$ is the constant and $K_3$ is the variable.

A duty factory calculating circuit 129 calculates from the feedback data a current pulse width for driving the solenoid 112 of the solenoid valve 110. If, when the slip speed variation value (S-S') is increased during the speed changing period as would occur when the speed of the kick-down drum 25 changes abruptly, the slip speed S is approached to the target value So by directly calculating the feedback data in accordance with the deviation value (S-So), hunting or shocking is liable to occur with the automatic speed changer. However, in the feedback data calculating circuit 126, if the feedback data is decreased so that the calculation value is decreased as much as proportional to the variation value, whereby the slip speed is allowed to gradually reach the target value, hunting or shocking is prevented. The above-described values $K_2$ and $K_3$ are so selected as to achieve the abovedescribed operation. The output of the duty factor calculating circuit 129 is applied to an AND circuit 130.

The deviation value (S-So) outputted by the deviation calculating circuit 125 is applied to a comparator 131. The comparator 131 provides an output signal when the calculation value (S-So) is maintained at a certain level, for instance 100 rpm, or higher for a certain period of time, for instance five seconds. In response to the output signal, a hold circuit 132 produces an output signal, for instance, for five minutes. A NOT circuit 133 is connected to one input terminal of the AND circuit 130. When the NOT circuit 133 receives the output signal of the hold circuit 132, the NOT circuit 133 provides no output signal to disable the AND circuit 130. Only when the hold circuit 132 produces the output signal the NOT circuit 133 produces the output signal to enable the AND circuit 130.

The engine load detecting device 140 and the water temperature detecting device 144 are connected to comparators 134 and 135, respectively. The comparator 134 provides an output signal when the suction manifold negative pressure is −60 mmHg or less, i.e., in the load range other than the full load range of the engine 1. The comparator 135 produces an output signal under the normal operating condition when the engine cooling water temperature is, for instance, at 50° C. or higher. The comparators 134 and 135 are connected to an AND circuit 136. The AND circuit 136 provides an output signal only when the two comparators provide the output signals. Only when the output signal of the AND circuit 136 is applied to a calculation start circuit 137, the latter 137 operates to permit the calculation of the slip speed to supply the pulse current to the solenoid valve 112.

In the electronic control device 120, the calculation of the slip speed is started under the normal engine operating condition and with the operating range other than the full load operating range, the feedback data is calculated from the slip speed variation value and the deviation value from the target value, and the pulse current calculated according to the feedback data by the duty factor calculating circuit 129 is applied to the solenoid 112, to control the slip data of the friction clutch 9. When the comparator 131 detects that the deviation value is maintained higher than the predetermined level for the predetermined period of time, the AND circuit 130 is disabled by the NOT circuit 133. As a result, the supply of pulse current to the solenoid 112 is interrupted, and the friction clutch 9 is released. After a predetermined period of time has passed, the provision of the output signal of the hold circuit 132 is suspended. As a result, the AND circuit 130 is enabled by the NOT circuit 133 again; that is, the supply of the pulse current is started again, to operate the friction clutch 9.

In the operating range other than the above-described operating range, the supply of the electrical signal from the AND circuit 130 to the solenoid 112 is suspended by an instruction signal from the calculation start circuit 137. That is, the supply of the pulse current to the solenoid 112 is suspended, to release the friction clutch 9.

As is apparent from the above description, according to the invention, if the slip data of the clutch is maintained at the predetermined level or higher for the predetermined period of time because of the abnormal decrease of the hydraulic pressure applied to the friction clutch, a fail-safe circuit constituted by the comparator 131, the hold circuit 132 and the NOT circuit 133 disables the AND circuit 130 to release the operation of the friction clutch so that the power is transmitted through the torque converter 3. Accordingly, the burning of the friction plate 35 due to heat generated by the clutch and the sticking of the valves in the hydraulic system due to powder created by the wear of the friction plate or the like can be prevented, whereby the automatic speed changer is operated positively and the reliability thereof is improved. The above-described abnormal condition may disappear a very short time after the operation of the friction clutch has been released. Therefore, it is considerably effective that the hold circuit 132 automatically effects the operation of the friction clutch in the predetermined period of time.

While the preferred embodiment of the invention has been described with reference to the drawings, it is particularly understood that the invention is not limited thereto or thereby, i.e., it will be obvious to those skilled in the art that various changes and modifications may be made therein without departing from the invention.

Figure 5:
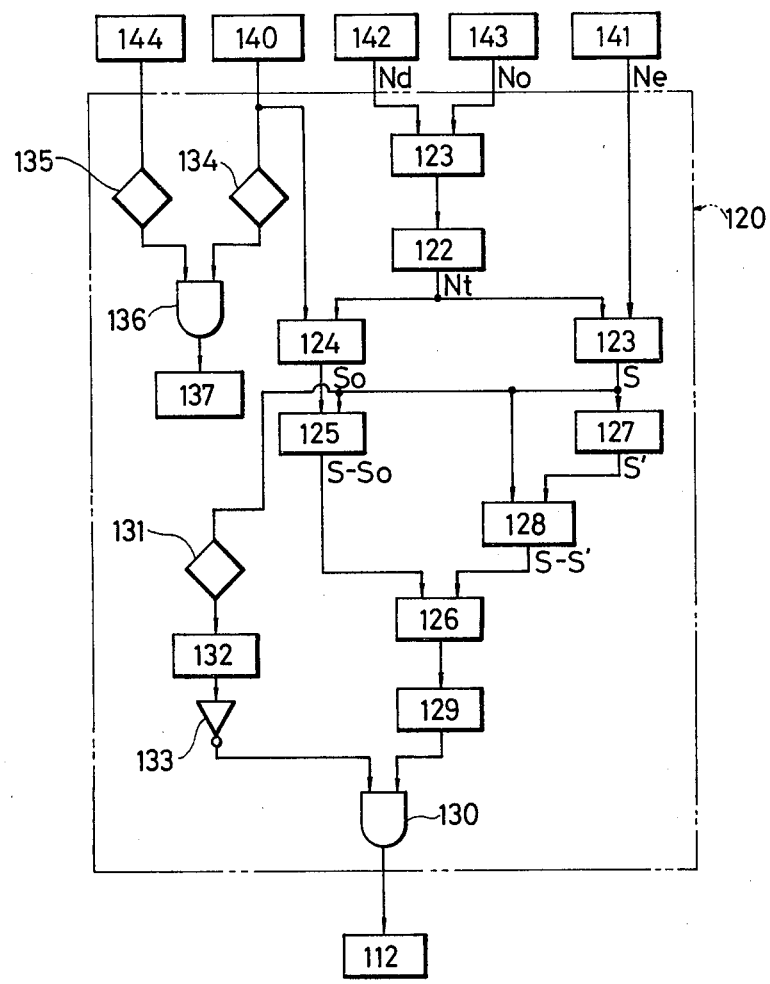
FIG. 5 is a block diagram showing one modification of the electronic control device in FIG. 4.

For instance, the invention can be modified as shown in FIG. 5. In the modification, the comparator 131 receives the output slip speed S of the slip speed calculating circuit 123, and provides the output signal when the slip speed value is maintained at a predetermined level higher than the above-described level for a predetermined period of time, for instance five seconds. This modification provides the same action and effect as those of the above-described embodiment.

In the above-described embodiment, the hold circuit 132 operates to restore the operation of the friction clutch automatically at the predetermined period of time, for instance five seconds, after the operation of the clutch was released. In the modification, the hold circuit 132 operates in association with the on-off operation of the engine key. That is, the hold circuit 132 is so designed that the release of the operation of the friction clutch is continued until the engine key is turned off, and the operation of the friction clutch is effected again when the engine is turned on again or the engine key is turned off.

I claim:

1. A friction clutch control device located between an engine side drive shaft and a speed changer side input shaft for which power transmission is effected through a fluid coupling of a fluid coupling type automatic speed changer for a vehicle, comprising:
   a friction clutch;
   a hydraulic operating device for operating said friction clutch into and out of engagement, said hydraulic operating device being coupled in parallel with said fluid coupling so as to provide a separate path for power transmission;
   drive condition detecting means for detecting drive conditions of an engine of said vehicle;
   speed difference detecting means for detecting a first difference (S) between speeds of said drive shaft and said input shaft;
   speed difference setting means for setting a second speed difference (So) between said drive shaft and said input shaft according to a signal provided by said drive condition detecting means;
   hydraulic pressure controlling means for controlling a hydraulic pressure supplied to said hydraulic operating device so that said first speed difference (S) detected by said speed difference detecting means approaches said second speed difference (So) set by said speed difference setting means; and
   a fail-safe circuit which, when said first speed difference (S) is maintained at an abnormally large level for a predetermined period of time, stops said hydraulic pressure controlling means, to release said friction clutch.

2. The friction clutch control device as claimed in claim 1, wherein said drive condition detecting means comprises:
- a load detecting device for detecting a load of said engine; and
- a speed detecting device for detecting a speed of at least one of said drive shaft and said input shaft.

3. The friction clutch control device as claimed in claim 1, wherein said fail-safe circuit operates to stop said hydraulic pressure controlling means to release said friction clutch when a deviation value (S-So) which is a difference value between said first and second speed differences (S and So) is maintained at a predetermined level or higher for a predetermined period of time.

4. The friction clutch control device as claimed in claim 1, wherein said fail-safe circuit operates to stop said hydraulic pressure controlling means to release said friction clutch when said first speed difference (S) is maintained at a predetermined level or higher for a predetermined period of time.

5. The friction clutch control device as claimed in claim 1, wherein said fail-safe circuit comprises:
- an operation restoring circuit which restores an operation of said friction clutch when the operation of said friction clutch is maintained released by said fail-safe circuit for a predetermined period of time.

6. The friction clutch control device as claimed in claim 1, wherein said fail-safe circuit comprises:
- an operation restoring circuit which maintains the release of said friction clutch which is effected by said fail-safe circuit until an engine key is turned off, and restores the operation of said friction clutch when said engine key is turned on again.

7. The friction clutch control device as claimed in claim 1, wherein said hydraulic pressure controlling means comprises:
- a hydraulic pressure source;
- a hydraulic pressure control valve interposed in an oil path adapted to introduce a hydraulic pressure generated by said hydraulic pressure source to said hydraulic operating device, to control an operating hydraulic pressure introduced to said hydraulic operating device;
- a solenoid valve for adjusting a controlling hydraulic pressure exerted on said hydraulic pressure control valve; and
- a current control device for supplying a control current to said solenoid valve according to signals from said speed difference setting means and said speed difference detecting means,
- the hydraulic pressure from said hydraulic pressure source being applied through an orifice to an opening which is opened and closed by said solenoid valve to create a controlling hydraulic pressure, said controlling hydraulic pressure between said orifice and said opening acting on said hydraulic pressure control valve, said hydraulic pressure control valve controlling the operating hydraulic pressure applied to said hydraulic operating device from said hydraulic pressure source according to the magnitude of said controlling hydraulic pressure.

8. The friction clutch control device as claimed in claim 7, wherein said solenoid valve operates to open and close said opening in response to a pulse signal supplied by said current control device, a width of said pulse signal being controlled to change a rate of time for opening and closing said opening, to change said controlling hydraulic pressure.

9. The friction clutch control device as claimed in claim 7, further comprising a reducing valve located in the oil path between said hydraulic pressure source and said orifice, for adjusting the hydraulic pressure introduced to said orifice to a predetermined low value.

10. The friction clutch control device as claimed in claim 1, wherein said hydraulic operating device comprises an apply-side hydraulic pressure chamber and a release-side auxiliary hydraulic pressure chamber, said hydraulic operating device being brought into engagement when a hydraulic pressure is applied to said apply-side hydraulic pressure chamber and being brought out of engagement when a hydraulic pressure is applied to said release-side auxiliary hydraulic pressure chamber.

11. The friction clutch control device as claimed in claim 1, wherein said speed difference detecting means comprises a first speed detecting device for detecting a speed of said drive shaft and a second speed detecting device for detecting a speed of said input shaft, said speed difference detecting means detecting a difference between the speeds of said two shafts from signals outputted by said first and second speed detecting devices.

12. The friction clutch control device as claimed in claim 11, further comprising gear means located between said speed changer side input shaft and an output shaft, said gear means bringing a plurality of friction engagement means into and out of engagement selectively to obtain a plurality of reduction gear ratios, said gear means having a plurality of rotating members, and said second speed detecting device having means for detecting speeds of two rotating members selected from said plurality of rotating members, the speeds of said two rotating members being used to calculate the speed of said input shaft.

* * * * *